United States Patent [19]

Claude et al.

[11] 4,451,526

[45] May 29, 1984

[54] MULTILAYER COMPOSITE MATERIAL, ESPECIALLY FOR CLOSURES FOR PLASTIC CONTAINERS

[75] Inventors: Bruno Claude, Montivilliers; Jean-Jacques Labaig, Le Havre; Christian Martinez, Harfleur, all of France

[73] Assignee: Compagnie Francaise de Raffinage, Paris, France

[21] Appl. No.: 410,035

[22] Filed: Aug. 20, 1982

[30] Foreign Application Priority Data

Aug. 26, 1981 [FR] France ................. 81 16315

[51] Int. Cl.$^3$ .................. B32B 7/02; B32B 27/08
[52] U.S. Cl. ..................... 428/216; 156/327; 156/334; 215/232; 428/355; 428/461; 524/504
[58] Field of Search .............. 428/461, 35, 216, 355; 524/504; 215/232; 156/327, 334

[56] References Cited

U.S. PATENT DOCUMENTS

| | | | |
|---|---|---|---|
| 4,250,227 | 2/1981 | Claude et al. | 428/461 |
| 4,382,127 | 5/1983 | Claude et al. | 525/504 |
| 4,398,644 | 8/1983 | Claude et al. | 215/232 |

*Primary Examiner*—Thomas J. Herbert, Jr.

[57] ABSTRACT

A multilayer composite material, suitable for capping plastic milk bottles and other containers, comprising;
 (a) a metal foil,
 (b) a polyolefin film, and
 (c) an adhesive layer bonding the metal foil and the polyolefin film together and formed of two compounds A and B; wherein said metal foil has a thickness between 25 and 75 microns; said polyolefin film has a thickness between 10 and 30 microns; and said adhesive layer has a thickness between 0.5 and 6 microns, and preferably between 2 and 5 microns.

8 Claims, No Drawings

MULTILAYER COMPOSITE MATERIAL, ESPECIALLY FOR CLOSURES FOR PLASTIC CONTAINERS

The present invention relates to multilayer composite materials intended in particular for the manufacture of caps for the closure of plastic containers such as bottles.

It is known at present to use for the closure of hollow bodies made, for example, of a plastic material, or for any other kind of container, caps or covers which may be circular or of another form and are punched out of multilayer sheets, and which tightly seal containers. The materials generally used to make such sealing caps are polyethylene, polypropylene, vinyl polychloride or polystyrene. The sealing of the containers by means of said cap is accomplished by joining the multilayer composite material and the container together by heat-sealing.

The multilayer sheets used comprise, in the main, a thin aluminum foil, a layer of adhesive, and a plastic film.

By the use of caps made from such multilayer composite materials and heat-sealed to the container under proper conditions, a tight closure essential to proper preservation of the product packaged in the container is obtained.

However, the need for a tight closure entails a number of drawbacks for the cap.

In particular, opening the container at the time of its first use is not very convenient; a pointed or cutting implement must be used to puncture the cap. If no such implement is handy, it may be possible to puncture the cap with a finger or a finger nail. However, when the packaged product must be kept sterile for as long as possible, these methods are not recommended.

It has already been proposed to overcome these drawbacks by using a multilayer composite material which, in addition to the impermeability provided by its being heat-sealed to the neck of the container, has the peculiarity of being "strippable", that is to say, of being readily ripped by hand from the surface of the neck at the moment when the container is being used for the first time.

In particular, applicants' assignee has produced composite materials of this type which formed the subject U.S. Pat. No. 4,398,644 issued Aug. 16, 1983 in the name of Bruno Claude et al.

U.S. Pat. No. 4,398,644 describes a two-layer composite material comprising an aluminum foil and an adhesive layer composed of two copolymers, the latter being graft copolymers obtained by the polymerization of ethylene or propylene and grafting onto the polyethylene or polypropylene an unsaturated monoethylenic carboxylic acid.

This composite material generally is perfectly satisfactory for the closure of milk bottles, and in particular for the closure of so-called UHT (ultra-high temperature) milk bottles, which are filled under sterile conditions with milk sterilized at high temperature (about 150° C.), followed by heat-sealing of the bottles, again under sterile conditions.

It can happen in a few rare cases that the closure of the bottle is not tight. In the case of so-called sterilized milk, for example, the bottle is filled with milk which has undergone no heat treatment. After heat-sealing, the milk is sterilized by placing the bottle in a sterilizer at 125° C. for about 15 minutes. The heat treatment for sterilization may, in a few cases, have a deterious effect on the imperviousness of the bottle. Nevertheless, the applicants have sought to develop a composite material that permits containers to be obtained which, to the extent possible are tight when closed with said composite material.

This it has accomplished with a three-layer composite material comprising:

(a) A metal foil,
(b) a polyolefin film, and
(c) an adhesive layer bonding the metal foil and the polyolefin film together and formed of two compounds A and B, compound A being a copolymer of an aliphatic monoolefin and an unsaturated monoethylenic carboxylic acid having good adhesion for the metal foil and the polyolefin film, and compound B being a compound apt to reduce the adhesion of compound A for the metal foil and/or the polyolefin film.

Such three-layer composite materials are described in U.S. Pat. No. 4,382,127, issued May 3, 1983 in applicants' name.

However, pursuing their work, the applicants have developed a more efficient composite material by optimizing the thickness of the various components of the composite.

The object of the present invention thus is to provide a strippable and impervious composite material intended in particular for the closure of a bottle of sterilized milk.

To this end, the invention has as an embodiment a multilayer composite material intended in particular for the manufacture of covers and caps for the closure of a container, said composite material comprising (a) a metal foil,
(b) a polyolefin film, and
(c) an adhesive layer bonding the metal foil and the polyolefin film together, formed of two compounds A and B, compound A being a copolymer of an aliphatic monolefin and an unsaturated monoethylenic carboxylic acid having good adhesion for the metal foil and for the polyolefin film, and compound B being a compound apt to reduce the adhesion of compound A for the metal foil and/or the polyolefin film, said composite material being characterized in that sad metal foil has a thickness between 25 and 75 microns; that said polyolefin film has a thickness between 10 and 30 microns; and that said adhesive layer has a thickness between 0.5 and 6 microns.

Compound A is a copolymer of an aliphatic monoolefin and an unsaturated monoethylenic carboxylic acid. This copolymer may be obtained, in particular, by the polymerization of propylene and grafting onto it a small amount, generally less than 5 weight percent, of an unsaturated carboxylic acid, which may be acrylic or methacrylic acid, for example.

When compound A is a copolymer of propylene as defined above, the polyolefin film may be a polypropylene film, and compound B may then be a copolymer of ethylene and an unsaturated monoethylenic carboxylic acid.

This ethylene copolymer may be obtained, in particular, by the polymerization of ethylene and grafting onto it a small amount, generally less than 5 weight percent, of an unsaturated monoethylenic carboxylic acid, which may be acrylic or methacrylic acid, for example.

The adhesive layer may in general contain from 20 to 80 weight percent of compound A and from 80 to 20 weight percent of compound B, and preferably from 80 to 60 weight percent of compound A and from 20 to 40 weight percent of compound B.

The thickness of the metal foil, for example, aluminum foil, may range from 25 to 75 microns and preferably ranges from 30 to 70 microns.

The thickness of the adhesive layer may range from 0.5 to 6 microns and preferably ranges from 2 to 5 microns.

The thickness of the polyolefin film may range from 10 to 30 microns and preferably ranges from 15 to 25 microns.

The multilayer composite materials in accordance with the invention are preferably prepared by a particular method comprising the following steps:

(a) Preparation of a suspension of compound A in an organic liquid, said suspension containing compound B either in suspension or in solution;

(b) coating of the metal foil with the suspension of compound A which contains compound B either in suspension or in solution;

(c) elimination of the organic liquid;

(d) melting of the compounds so as to obtain a continuous layer of the compounds on the metal foil; and (e) bonding of the metal foil coated with the adhesive layer to the polyolefin film.

The suspension of compound A containing compound B may be obtained by dissolving compounds A and B in an organic liquid and then cooling the solution so obtained, such cooling being preferably rapid.

Compound B may be soluble in the organic liquid at ambient temperature. In that case, it may be added to the suspension of compound A obtained in the manner described above.

Powders of compounds A and B may then be added to the solution obtained in order to increase the concentration of the suspension.

The metal foil may be coated by means known in the art, for example, by a transfer roller.

The organic liquid contained in the suspension must then be eliminated from the coated metal foil by drying of the support, for example, by heating in a tunnel dryer.

The metal foil is then brought to a sufficiently high temperature for the compounds to melt. Such melting of the layer of compounds may be effected by passing the metal foil over a cylinder which has been brought to a sufficiently high temperature.

The metal foil coated with the adhesive layer is then bonded to the polyolefin film by calendering at high temperature.

The composite materials in accordance with the invention may be used in the manufacture of caps or covers for the closure of containers. The composite materials may be secured to the containers by heat-sealing.

In heat-sealing, the composite material is applied to the container for a very short time (a few seconds) at a temperature which depends on the nature of the composite material and of the container. The temperature should be sufficiently high for the composite material to adhere well to the container.

For a polyethylene container, the heat-sealing temperature may range from 200° to 240° C.

For a polypropylene container, the heat-sealing temperature may range from 210° to 250° C.

When the composite materials in accordance with the invention are used to manufacture caps for the closure of containers, a tab may advantageously be provided on the cap to facilitate its being pulled off.

In general, the multilayer composite materials in accordance with the present invention are suitable for the closure of containers of any shape, such as boats, bottles, etc. They are well suited to form caps serving as closures for bottles containing liquid products.

They are particularly well suited for the closure of sterilized-milk bottles where the bottle, once filled with milk and closed, must be subjected to a heat treatment at about 125° C. for sterilization.

The example which follows will serve to illustrate the invention.

EXAMPLE

This example related to a multilayer composite material in accordance with the invention and to imperviousness and strippability tests run with containers obtained by the use of said composite materials.

Preparation of multilayer composite material

A suspension S1 was first prepared by dissolving two copolymers A and B in heptane at 150° C. Copolymer A was a polypropylene of grade 2 (in conformity with standard ASTM D 1238, charge 2.16 kg at 230° C.) containing 1 weight percent acrylic acid grafted onto it. It was added in such an amount that its concentration in the solution was 4.2 weight percent.

Copolymer B was a high-density (d=0.960) graft polyethylene having a weight-average molecular weight ($M_w$) of 110,000 and a number-average molecular weight ($M_n$) of 13,000 and containing 1 weight percent acrylic acid grafted onto it. It was added in such an amount that its concentration in the solution was 1.8 weight percent.

Suspension S1 was obtained by rapidly cooling the solution to 40° C.

The final suspension S was obtained by dispersing in suspension S1 by stirring at 20° C. a powder formed of a mixture of 70 weight percent of A and 30 weight percent of B.

The powder was added in such an amount that the final polymer concentration was 18 weight percent.

The suspension was used to coat, by means of a transfer roller, an aluminum foil having a thickness of 50 microns.

The coated foil was introduced into a tunnel dryer at 120° C. to eliminate the solvent and then placed on a cylinder heated to 240° C. to melt the deposit.

Thus a two-layer composite material was obtained which then was calendered at 240° C. between two cylinders with a polypropylene film having a thickness of 20 microns.

In this way, a multilayer composite material in accordance with the invention was obtained.

Imperviousness tests

The composite material was heat-sealed at 230° C. for 4 seconds, by compression on a 3 mm height to bottles made of high-density (d=0.960) polyethylene having a weight-average molecular weight ($M_w$) of 100,000 and a number-average molecular weight ($M_n$) of 12,000 which contained milk.

Sterilization was effected in a sterilizer at 125° C. for 15 minutes at a steam pressure of 2 bars.

The bottles were placed for 10 days in an oven at 40° C.

No leakage was observed on 1000 bottles tested.

Strippability tests

The force required to pull off the composite material which was heat-sealed to the bottles was measured by means of an INSTRON plastics tension tester equipped with a special fixture holding the bottle by its neck firmly in a lower movable jaw, with a stationary upper jaw maintaining the cap in fixed position by its tab. The pulling force was exerted in a plane substantially perpendicular to the plane in which the cap had been heat-sealed to the neck.

The caps were thus pulled from the surface of the neck of the bottles completely and without tearing. The pulling force was exerted at a constant rate of 500 mm/min.

The stripping forces observed were of the order of 1 daN.

These tests show that the composite materials in accordance with the invention are strippable while remaining impervious since, depending on the test used, stripping forces ranging from 0.6 to 1.25 daN may be regarded as satisfactory.

We claim:

1. A multilayer composite material intended in particular for the manufacture of covers or caps for the closure of a container, said composite material comprising
   (a) a metal foil,
   (b) a polyolefin film, and
   (c) an adhesive layer bonding the metal foil and the polyolefin film together and formed of two compounds A and B, compound A being a copolymer of an aliphatic monoolefin and an unsaturated monoethylenic carboxylic acid having good adhesion for the metal foil and the polyolefin film, and compound B being a compound effective to reduce the adhesion of compound A for the metal foil and/or the polyolefin film, the improvement in said composite material comprising said metal foil having a thickness between 25 and 75 microns; said polyofin film having a thickness between 10 and 30 microns; and said adhesive layer having a thickness between 0.5 and 6 microns.

2. A composite material according to claim 1, wherein compound A is a copolymer of propylene and acrylic acid; compound B is a copolymer of ethylene and acrylic acid; and the polyolefin film is a polypropylene film.

3. A composite material according to claim 1, wherein said metal foil has a thickness between 30 and 70 microns; said polyopefin film has a thickness between 15 and 25 microns; and said adhesive layer has a thickness between 2 and 5 microns.

4. A composite material according to claim 3, wherein the metal foil is an aluminum foil.

5. A composite material according to claim 4, wherein compound A is a copolymer of propylene and acrylic acid; compound B is a copolymer of ethylene and acrylic acid; and the polyolefin film is a polypropylene film.

6. A composite material according to claim 1, wherein the metal foil is an aluminum foil.

7. A composite material according to claim 6, wherein compound A is a copolymer of propylene and acrylic acid; compound B is a copolymer of ethylene and acrylic acid; and the polyolefin film is a polypropylene film.

8. Method of capping a bottle made of high-density polyethylene and suitable to hold sterilized milk, comprising heat sealing the composite material according to one of claims 1 to 7 to the bottle over its opening.

* * * * *